(12) United States Patent
Pavane

(10) Patent No.: US 11,067,136 B1
(45) Date of Patent: Jul. 20, 2021

(54) ONE-WAY CLUTCH WITH REDUCED FRICTION

(71) Applicant: Schaeffler Technologies AG & Co. KG, Herzogenaurach (DE)

(72) Inventor: Bruno Pavane, Sorocaba (BR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/856,547

(22) Filed: Apr. 23, 2020

(51) Int. Cl.
*F16D 41/066* (2006.01)
*F16D 41/06* (2006.01)

(52) U.S. Cl.
CPC .... *F16D 41/066* (2013.01); *F16D 2041/0605* (2013.01); *F16D 2041/0665* (2013.01)

(58) Field of Classification Search
CPC ............... F16D 41/066–067; F16D 2041/0605
See application file for complete search history.

(56) References Cited

U.S. PATENT DOCUMENTS

| | | | | |
|---|---|---|---|---|
| 2,069,558 A * | 2/1937 | Rauen | ................... | F16D 41/064 192/45.02 |
| 3,750,782 A * | 8/1973 | Costantini | ............. | F16D 41/066 192/45.02 |
| 5,595,272 A * | 1/1997 | Zhou | ..................... | F16D 41/066 188/82.84 |
| 6,938,745 B2 | 9/2005 | Ohishi et al. | | |
| 8,869,651 B2 * | 10/2014 | Yeh | .......................... | F16H 1/10 74/640 |
| 8,931,609 B2 | 1/2015 | Shirataki et al. | | |
| 9,388,864 B2 * | 7/2016 | Ando | .................... | F16D 41/066 |
| 2014/0083245 A1 * | 3/2014 | Yeh | ....................... | F16H 49/001 74/640 |
| 2015/0167753 A1 * | 6/2015 | Ando | .................... | F16D 41/066 192/45.018 |

* cited by examiner

*Primary Examiner* — David R Morris
(74) *Attorney, Agent, or Firm* — Reid A. Baldwin

(57) ABSTRACT

A one-way clutch is designed to minimize parasitic drag in the over-running condition. Rollers are positioned radially between an inner ring and outer ring and rotate with the inner ring. Positioning pins push the rollers up ramps on the inner ring into contact with the outer ring. In the locked mode, the outer ring also tends to push the rollers up the ramps into tighter contact. In the over-running condition, the outer ring tends to push the rollers down the ramp, against the force of the positioning pins, and away from contact. Each positioning pin includes a ball which is rotatably held in a retainer via microspheres. The ball is in rolling contact with the roller, as opposed to sliding contact, thereby limiting parasitic drag.

11 Claims, 2 Drawing Sheets

ONE-WAY CLUTCH WITH REDUCED FRICTION

TECHNICAL FIELD

The disclosure applies to the general field of one-way clutches. More particularly, a one-way clutch with reduced parasitic drag is disclosed.

BACKGROUND

One-way clutches are used in transmissions to passively preclude relative rotation between two components in one-direction, while permitting relative rotation in the opposite direction. In a locked state, torque is transmitted between the components and speeds of the two components are constrained to be equal. In an over-running state, the two components have relative rotation. In practice, some parasitic drag torque is transmitted in the over-running state. It is desirable to minimize this parasitic drag torque such that the transmission is as efficient as possible.

SUMMARY

A one-way clutch includes inner and outer rings, a plurality of rollers, and a plurality of positioning pins. The outer ring has an inner surface, which may be cylindrical. The inner ring has an outer surface with a plurality of ramps. The plurality of rollers are situated radially between the ramps and the inner surface. The rollers may be cylindrical or may be ball-shaped. The plurality of positioning pins are retained in the inner ring. Each positioning pin is configured to push a corresponding one of the rollers along a corresponding one of the ramps to preclude relative rotation between the inner ring and the outer ring in one direction. Each positioning pin includes a retainer, a ball, a plurality of microspheres, and a spring. The retainer has an open end. The ball is retained by the retainer and partially exposed through the open end to contact the corresponding roller. The plurality of microspheres are held within the retainer and are configured to permit free rotation of the ball with respect to the retainer. The spring, which may be a compression spring, is configured to push the retainer toward the corresponding roller to push the corresponding roller up the corresponding ramp into contact with the inner surface.

A positioning pin is configured to push a roller of a one-way clutch along a ramp of an inner ring of the one-way clutch. The positioning pin includes a retainer, a ball, a plurality of microspheres, and a spring. The retainer has an open end. The ball is retained by the retainer and partially exposed through the open end to contact the roller. The plurality of microspheres are retained within the retainer and configured to permit free rotation of the ball with respect to the retainer. The spring is attached to the retainer and configured to push the retainer relative to the inner ring to push the roller up the ramp.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
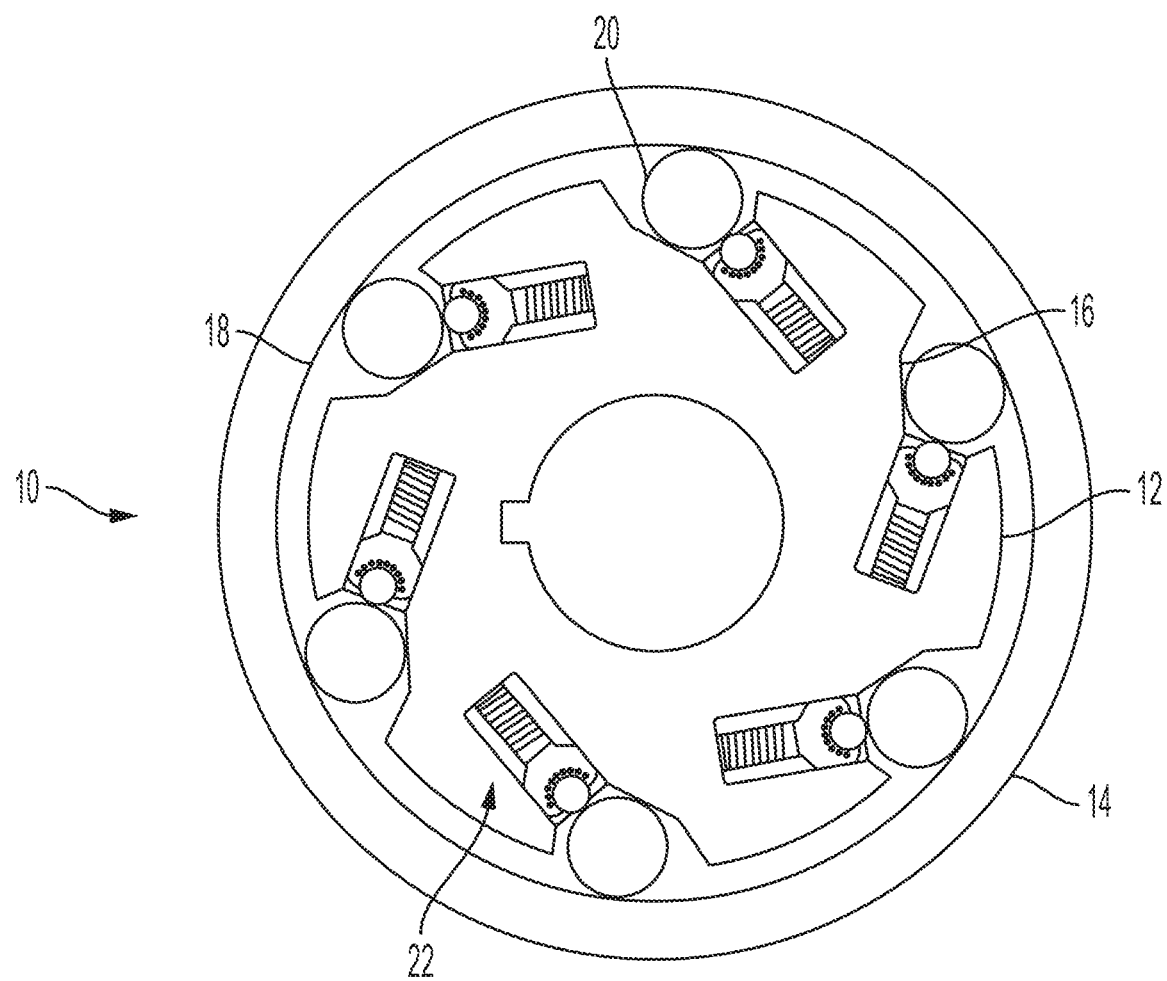
FIG. 1 is a cross section of a one-way clutch.

FIG. 1 is a cross section of a one-way clutch 10. The one-way clutch includes an inner ring 12 and an outer ring 14. In use, at least one of the two rings is supported for rotation. The other ring may be stationary or may also be supported for rotation. The inner ring 12 may rotate counter-clockwise relative to the outer ring with minimal drag. However, the one-way clutch locks preventing clockwise rotation of the inner ring 12 relative to the outer ring 14.

The inner ring 12 has a number of ramps 16. Outer ring 14 has a cylindrical inner surface 18. A number of rollers 20 are positioned radially between the ramps 16 and the inner cylindrical surface 18 of outer ring 14. The rollers may be cylindrical. Alternatively, the rollers may be ball-shaped. Positioning pins 22 push the rollers 20 along the ramps 16 into contact with the inner surface 18. When inner ring 12 turns counter-clockwise, rollers 20 slightly compress positioning pins 22 and lift off from ramped surface 16. Rollers roll along surface 18 with minimal drag. Due to the properties of positioning pins 22 which are discussed below, rollers 20 also roll with respect to the positioning pins with minimal drag. This is in contrast to a one-way clutch in which a spring is used instead in place of the positioning pins. In such a one-way clutch, sliding contact between the spring and the roller causes wear and drag.

Figure 2:
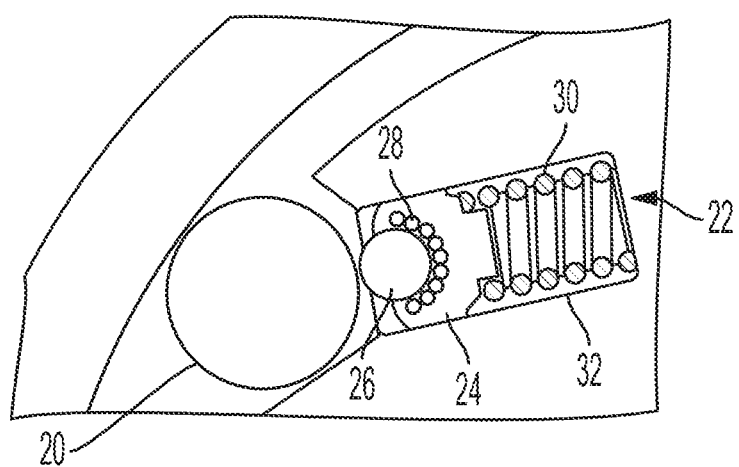
FIG. 2 is a detail of FIG. 1 illustrating the structure of one of the positioning pins of the one-way clutch of FIG. 1.
Figure 3:
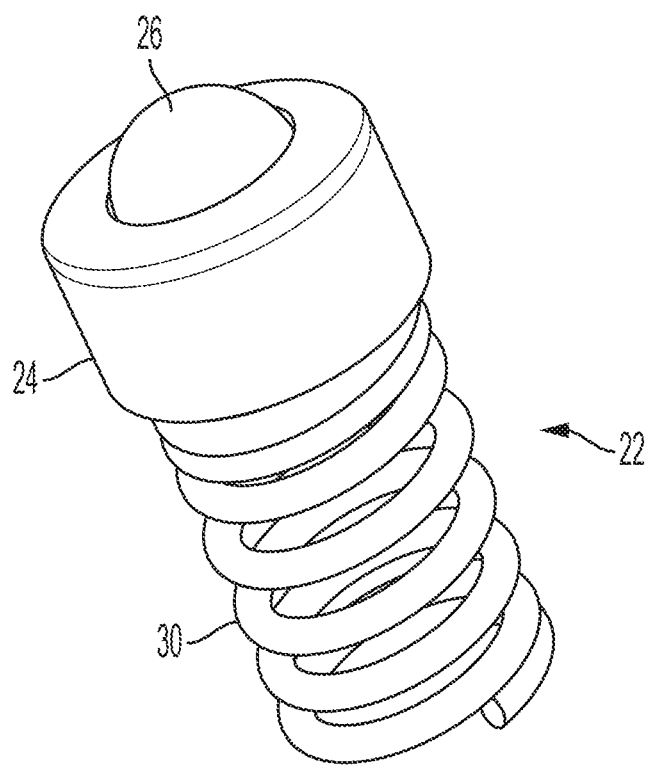
FIG. 3 is a pictorial view of a positioning pin.

FIG. 2 illustrates the structure of a representative one of the positioning pins 22. FIG. 3 is a pictorial view of a positioning pin. Each positioning pin includes a retainer 24 having an open end and a closed end. A ball 26 is held by the retainer such that a portion of the ball extends past the open end of the retainer to contact the corresponding roller 20. On the side of the ball opposite the roller, a number of microspheres 28 separate the ball from the retainer. These microspheres facilitate low-friction rotation of the ball 26 with respect to the retainer. A compression spring 30 pushes against the closed side of the retainer toward the corresponding roller to push the corresponding roller up the corresponding ramp into contact with the inner surface. The positioning pin is held in a hole 32 defined in the inner ring.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A one-way clutch comprising:
an outer ring having an inner surface;
an inner ring having an outer surface with a plurality of ramps;
a plurality of rollers situated radially between the ramps and the inner surface; and
a plurality of positioning pins retained in the inner ring, each positioning pin configured to push a corresponding one of the rollers along a corresponding one of the ramps to preclude relative rotation between the inner ring and the outer ring in one direction, each positioning pin comprising
a retainer having an open end;
a ball retained by the retainer and partially exposed through the open end to contact the corresponding roller;
a plurality of microspheres within the retainer and configured to permit free rotation of the ball with respect to the retainer; and
a spring configured to push the retainer toward the corresponding roller to push the corresponding roller up the corresponding ramp into contact with the inner surface.

2. The one-way clutch of claim 1 wherein the inner surface is cylindrical.

3. The one-way clutch of claim 2 wherein each of the rollers are cylindrical.

4. The one-way clutch of claim 1 wherein each of the rollers is ball-shaped.

5. The one-way clutch of claim 1 wherein the spring is a compression spring.

6. A one-way clutch comprising:
a first ring having a cylindrical surface;
a second ring having a surface radially facing the cylindrical surface and defining a plurality of ramps;
a plurality of rollers situated radially between the ramps and the cylindrical surface; and
a plurality of positioning pins retained in the second ring, each positioning pin configured to push a corresponding one of the rollers along a corresponding one of the ramps to preclude relative rotation between the first ring and the second ring in one direction, each positioning pin comprising
a retainer having an open end;
a ball retained by the retainer and partially exposed through the open end to contact the corresponding roller;
a plurality of microspheres within the retainer and configured to permit free rotation of the ball with respect to the retainer; and
a spring configured to push the retainer toward the corresponding roller to push the corresponding roller up the corresponding ramp into contact with the cylindrical surface.

7. The one-way clutch of claim 6 wherein each of the rollers are cylindrical.

8. The one-way clutch of claim 6 wherein each of the rollers is ball-shaped.

9. The one-way clutch of claim 6 wherein the first ring is radially outside the second ring.

10. The one-way clutch of claim 6 wherein the spring is a compression spring.

11. A positioning pin configured to push a roller of a one-way clutch along a ramp of an inner ring of the one-way clutch, the positioning pin comprising:
a retainer having an open end;
a ball retained by the retainer and partially exposed through the open end to contact the roller;
a plurality of microspheres within the retainer and configured to permit free rotation of the ball with respect to the retainer; and
a spring attached to the retainer and configured to push the retainer relative to the inner ring to push the roller up the ramp.

* * * * *